US012713004B2

(12) United States Patent
Chen et al.

(10) Patent No.: US 12,713,004 B2
(45) Date of Patent: Aug. 18, 2026

(54) BILATERAL MATCHING AND DECODER SIDE MOTION VECTOR REFINEMENT WITH OUT-OF-FRAME BOUNDARY CONDITION

(71) Applicant: Tencent America LLC, Palo Alto, CA (US)

(72) Inventors: Lien-Fei Chen, Hsinchu (TW); Han Gao, San Diego, CA (US); Xin Zhao, San Jose, CA (US); Xiaozhong Xu, State College, PA (US); Roman Chernyak, Santa Clara, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 39 days.

(21) Appl. No.: 18/587,718

(22) Filed: Feb. 26, 2024

(65) Prior Publication Data

US 2024/0291963 A1 Aug. 29, 2024

Related U.S. Application Data

(60) Provisional application No. 63/448,619, filed on Feb. 27, 2023.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/172* (2014.11);
(Continued)

(58) Field of Classification Search
CPC .. H04N 19/105; H04N 19/132; H04N 19/172; H04N 19/176; H04N 19/52; H04N 19/567
See application file for complete search history.

(56) References Cited

U.S. PATENT DOCUMENTS

| | | | | |
|---|---|---|---|---|
| 2021/0160535 | A1* | 5/2021 | Chen .................... | H04N 19/139 |
| 2025/0016346 | A1* | 1/2025 | Chen .................... | H04N 19/105 |

OTHER PUBLICATIONS

International Search Report and Written Opinion received for PCT Patent Application No. PCT/US2024/017496 , mailed on Jun. 4, 2024, 7 pages.

* cited by examiner

*Primary Examiner* — Hesham K Abouzahra
(74) *Attorney, Agent, or Firm* — ARENTFOX SCHIFF LLP

(57) ABSTRACT

A method of video decoding includes receiving a coded video bitstream comprising coded information of a current block in a current picture. The coded information is indicative of a bi-directional prediction with a refinement. The refinement determines an offset based on a plurality of calculations, and each calculation includes reference samples of a first reference picture and a second reference picture for the current picture. The method further includes determining that a first calculation in the plurality of calculations uses a first reference sample that is an out of boundary (OOB) prediction sample. An OOB prediction sample of a reference picture is out of a frame boundary of the reference picture. The method also includes performing the refinement that determines the offset based on the plurality of calculations with at least the first reference sample being excluded, and reconstructing the current block according to the bi-directional prediction with the offset.

12 Claims, 8 Drawing Sheets

(51) Int. Cl.

| | |
|---|---|
| ***H04N 19/172*** | (2014.01) |
| ***H04N 19/176*** | (2014.01) |
| ***H04N 19/52*** | (2014.01) |
| ***H04N 19/567*** | (2014.01) |

(52) U.S. Cl.
CPC ........... *H04N 19/176* (2014.11); *H04N 19/52* (2014.11); *H04N 19/567* (2014.11)

100
108
109
105
111
112
110
130
107
106
104
120
103
101
102
113

BILATERAL MATCHING AND DECODER SIDE MOTION VECTOR REFINEMENT WITH OUT-OF-FRAME BOUNDARY CONDITION

INCORPORATION BY REFERENCE

The present application claims the benefit of priority to U.S. Provisional Application No. 63/448,619, "Improvement of Bilateral Matching And Decoder Side Motion Vector Refinement With Out-Of-Frame Boundary Condition" filed on Feb. 27, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. In some examples, a method of video decoding includes receiving a coded video bitstream comprising coded information of a current block in a current picture. The coded information is indicative of a bi-directional prediction with a refinement. The refinement determines an offset based on a plurality of calculations, and each calculation includes reference samples of a first reference picture and a second reference picture for the current picture. The method further includes determining that a first calculation in the plurality of calculations uses a first reference sample that is an out of boundary (OOB) prediction sample. An OOB prediction sample of a reference picture is out of a frame boundary of the reference picture. The method also includes performing the refinement that determines the offset based on the plurality of calculations with at least the first reference sample being excluded, and reconstructing the current block according to the bi-directional prediction with the offset.

In some examples, the refinement includes a decoder side motion vector refinement (DMVR) that determines a motion vector offset based on calculations of bilateral matching (BM) cost values associated with motion vector offset candidates.

In some examples, the first calculation calculates a first BM cost as a distortion measure between corresponding reference samples in a pair of reference blocks that are associated with a first motion vector offset candidate, and a first reference block in the pair of reference blocks includes the first reference sample that is the OOB prediction sample. The method includes discarding the first motion vector offset candidate that excludes the first calculation from the plurality of calculations. In an example, the method includes assigning a maximum BM cost value associated with the first motion vector offset candidate and/or marking the first motion vector offset candidate as unavailable.

In some examples, the first motion vector offset candidate corresponds to an integer position that is a neighboring position of a specific position having a lowest BM cost, and the method includes determining to use a fractional block matching to replace quadratic prediction for a fractional sample refinement at the specific position in response to the first motion vector offset candidate being discarded, and performing the fractional sample refinement for the specific position by calculating BM cost values at positions corresponding to fractional sample offsets.

In some examples, the first calculation calculates a first BM cost as a distortion measure between corresponding reference samples in a pair of reference blocks that are associated with a first motion vector offset candidate, and a first reference block in the pair of reference blocks includes the first reference sample that is the OOB prediction sample. To determining the offset, the method includes performing the first calculation with the first reference sample being excluded from the distortion measure.

In some examples, the method includes normalizing the first BM cost based on a pair number of the corresponding reference samples in the first calculation.

In some examples, to perform the first calculation, the method includes determining a plurality of reference sample pairs in the pair of reference blocks that each comprises at least a reference sample that is an OOB prediction sample, and determining whether a ratio of a pair number of the plurality of reference sample pairs to a total pair number of reference sample pairs in the pair of reference blocks is higher than a threshold. In response to the ratio being higher than the threshold, the method includes discarding the first motion vector offset candidate that excludes the first calculation from the plurality of calculations. In response to the ratio being lower than the threshold, the method includes performing the first calculation with the plurality of reference sample pairs being excluded from the distortion measure.

In some examples, the current block corresponds to at least one of a coding block and/or a subblock of the coding block.

In some examples, the refinement includes a bi-directional optical flow (BDOF) that calculates a prediction offset with optical flow based on correlation calculations of gradients according to the reference samples of the first reference picture and the second reference picture.

According to another aspect of the disclosure, an apparatus is provided. The apparatus includes processing circuitry. The processing circuitry can be configured to perform any of the described methods for video decoding/encoding.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
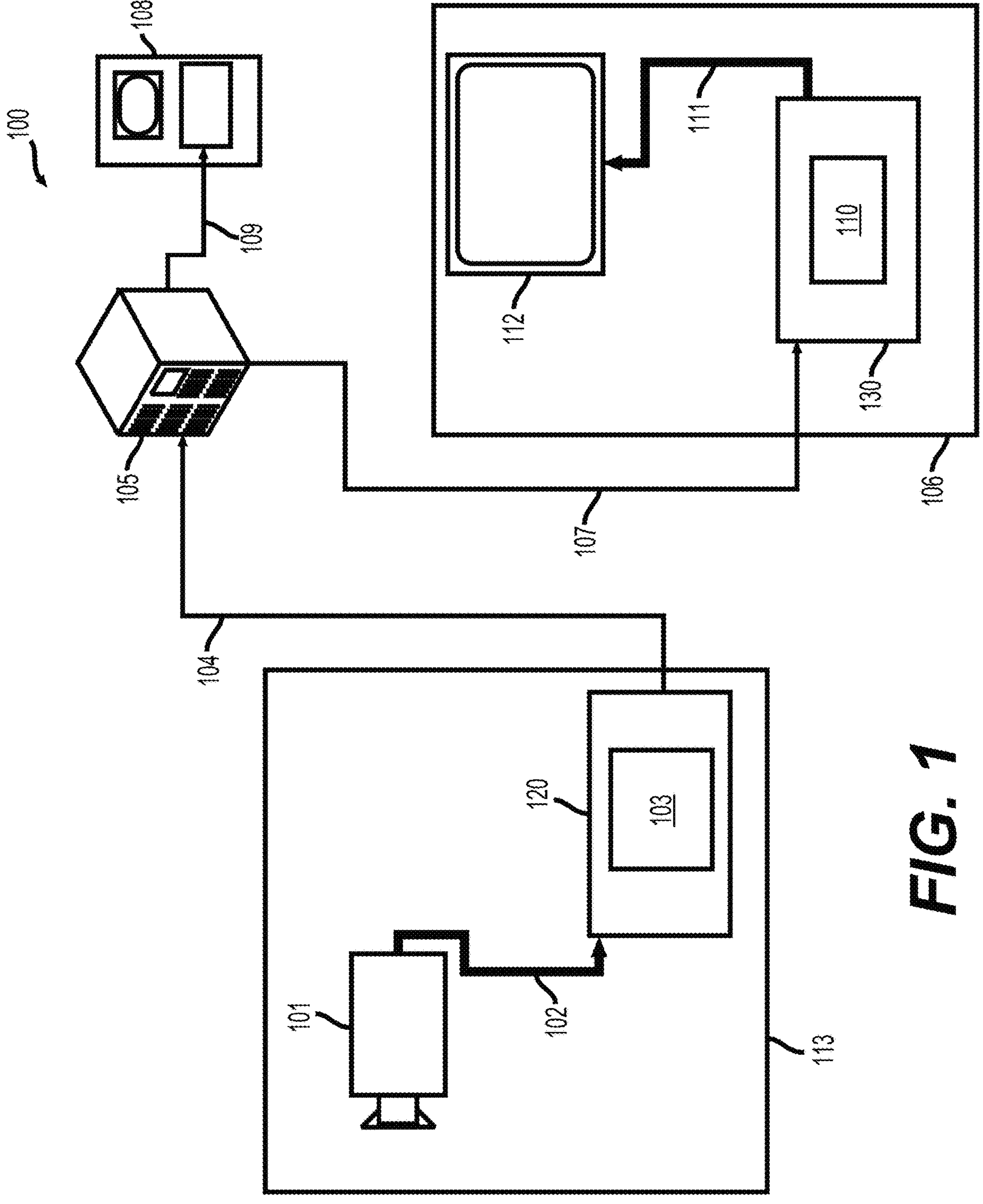
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
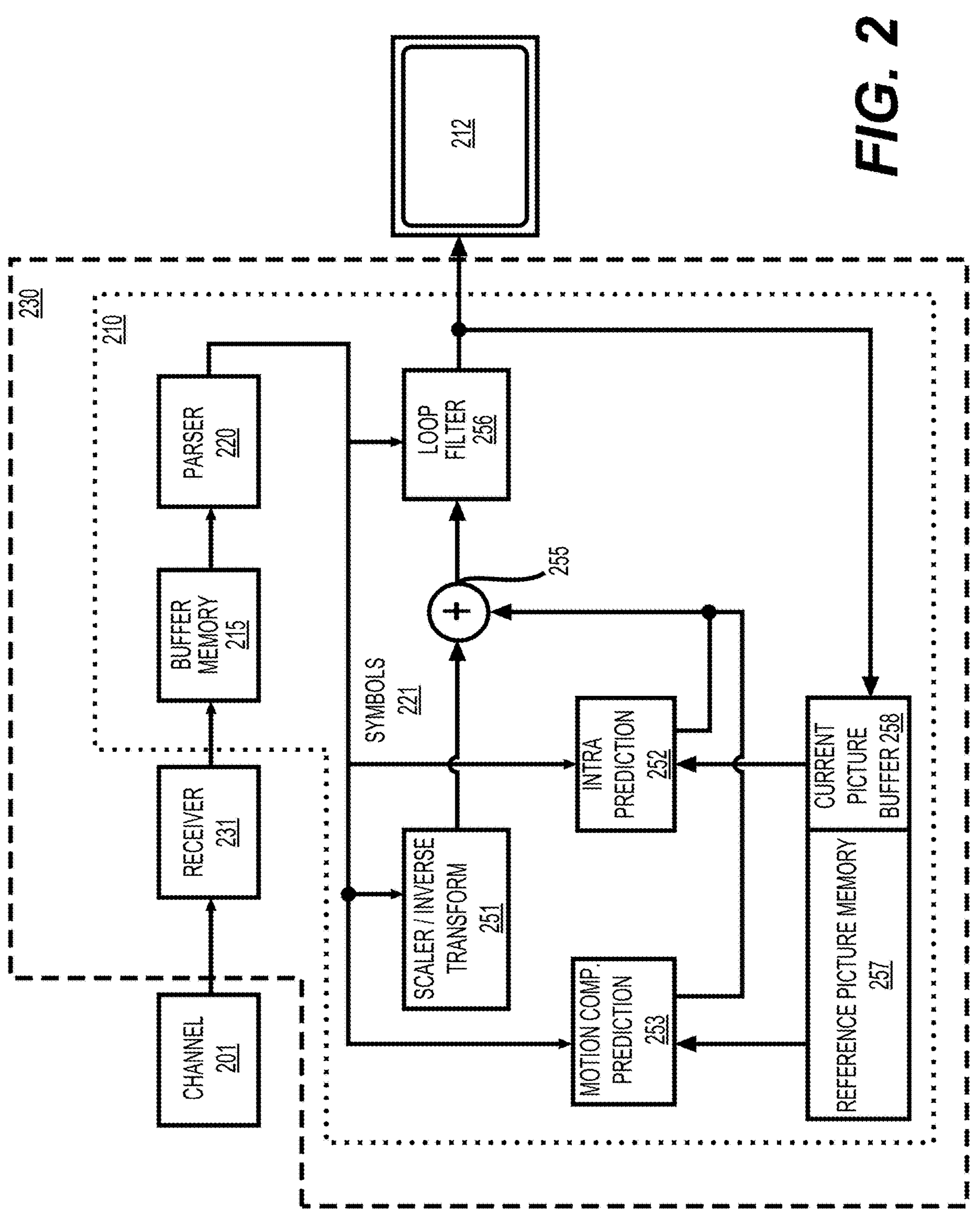
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220)

may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
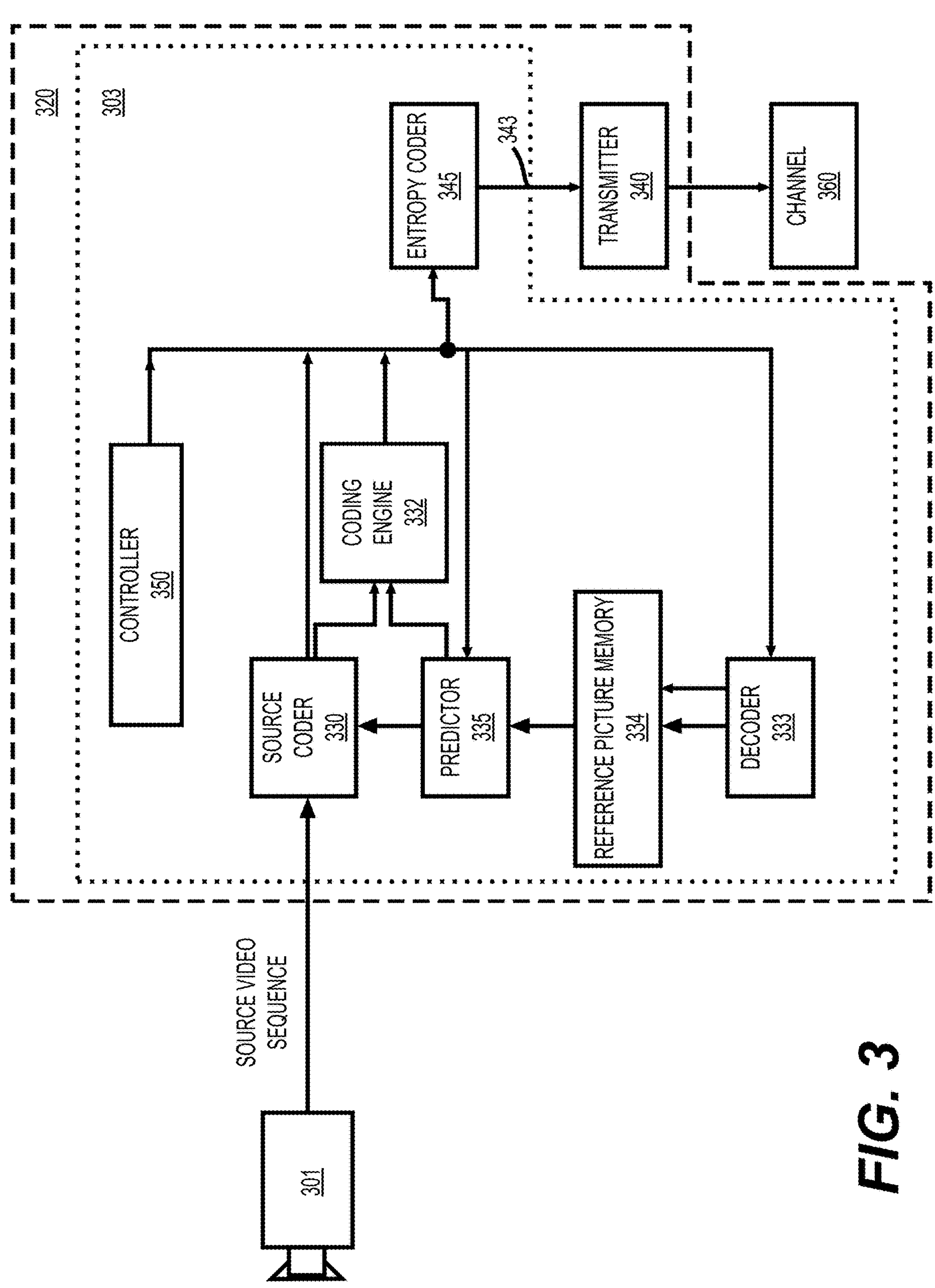
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques for bilateral matching and decoder side motion vector refinement with out of frame boundary conditions.

Various inter prediction modes can be used in video coding. For example, in VVC, for an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In some examples, such as in VVC, VVC Test model (VTM) reference software includes one or more new and refined inter prediction coding tools, such as an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like.

It is noted that the motion field storage may change for new standard. In an example, in order to use the temporal motion vector prediction (TMVP) in merge mode and AMVP mode, VVC requires the storage of the motion data in collocated reference frame, and is storing the motion data on a 8×8 block basis. To limit the required storage of MVs used for temporal prediction, VVC employs 10-bit mantissa-exponent representation method to compress stored MVs. In the development of beyond VVC reference software, such as ECM5, the granularity of motion storage is reduced to 4×4 block basis.

Some of the tools are described in detail in the present disclosure.

In the inter-picture prediction, a merge mode can be used to improve coding efficiency. In the merge mode, the motion vector can be derived from neighboring blocks and is directly used for motion compensation. In order to increase the accuracy of the MVs of the merge mode, a bilateral-matching (BM)-based decoder side motion vector refinement can be applied, such as in VVC. In a bi-prediction operation, a refined MV can be searched around initial MVs in a reference picture list L0 and a reference picture list L1. The BM calculates a distortion between two candidate blocks in the reference picture list L0 and list L1.

Figure 4:
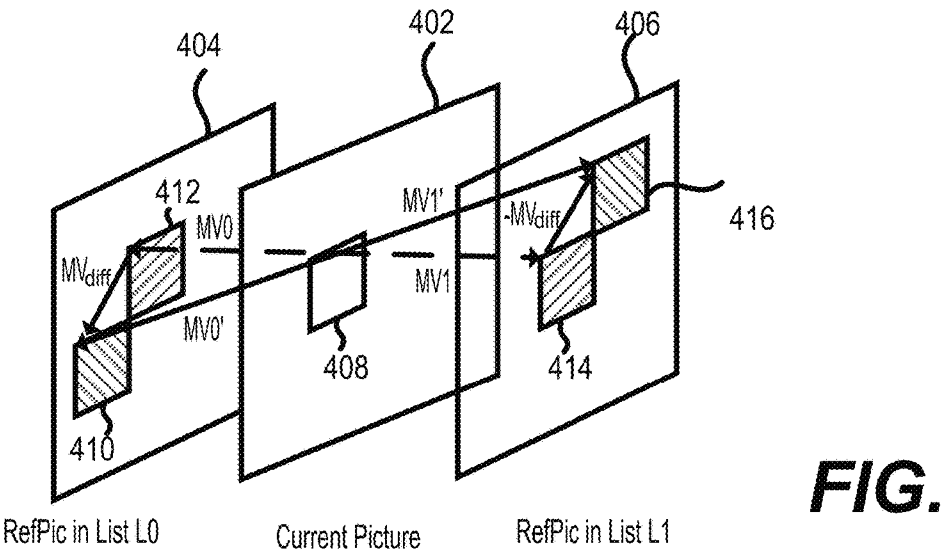
FIG. 4 shows an exemplary schematic view of a bilateral matching based decoder side motion vector refinement.

FIG. 4 shows an exemplary schematic view of a BM-based decoder side motion vector refinement. As show in FIG. 4, a current picture (402) can include a current block (408). The current picture can have a first reference picture (404) from (reference picture) list L0 and a second reference picture (406) from (reference picture) list L1. For the current block (408), according to initial motion vectors MV0 and MV1, a pair of reference blocks are identified in the first and second reference pictures. For example, an initial reference block (412) in the first reference picture (404) can be located according to the initial motion vector MV0 and an initial reference block (414) in the second picture (406) can be located according to an initial motion vector MV1. A searching process can be performed around the initial MV0 in the first reference picture (404) and the initial MV1 in the second reference picture (406). For example, an adjustment $MV_{diff}$ is applied to the initial MV0 and MV1 in the opposite direction to obtain MV candidate, such as MV0' and MV1'. According to the MV candidate, a pair of candidate reference blocks are identified in the first and second reference picture. For example, a candidate reference block (410) can be identified in the first reference picture (404) according to MV0' and a candidate reference block (416) can be identified in the second reference picture (406) according to MV1'. In some examples, bilateral matching (BM) refers to an operation that calculates a distortion measure between a pair of reference blocks of respective reference pictures for the current picture, such as a sum of absolute differences (SAD) between a pair of reference blocks as the distortion measure of the pair of reference blocks. For example, BM method calculates an initial SAD between the pair of initial reference blocks (412) and (414), and calculates a second SAD between the pair of candidate reference blocks (410) and (416). The initial SAD is associated with the initial MV (e.g., MV0 and MV1), the second SAD is associated with the MV candidate (e.g., MV0' and MV1'). Similarly, BM method can calculate SADs for a plurality of MV candidates around the initial MV. An MV candidate with the lowest SAD can become the refined MV and used to generate a bi-predicted signal to predict the current block (408).

In some examples (e.g., VVC), the application of DMVR is restricted and is only applied for the CUs which are coded with modes and features that satisfy certain conditions. If a block satisfies certain conditions, the DMVR algorithm is invoked. For example, the conditions (also referred to as requirement for DMVR or a set of conditions for DMVR) can include:

(1) CU level merge mode with bi-prediction MV,
(2) One reference picture is in the past and another reference picture is in the future with respect to the current picture,
(3) The distances (e.g., POC difference) from two reference pictures to the current picture are the same,
(4) Both reference pictures are short-term reference pictures,
(5) CU has more than 64 luma samples,
(6) Both CU height and CU width are larger than or equal to 8 luma samples,
(7) Bi-prediction with CU level weights (BCW) weight index indicates equal weight,
(8) weighted prediction (WP) is not enabled for the current block, and
(9) Combined inter and intra prediction (CIIP) mode is not used for the current block.

It is noted that the refined MV derived by DMVR process is used to generate the inter prediction samples and can be used in temporal motion vector prediction for future pictures coding. In some examples, the original MV is used in a deblocking process and also used in spatial motion vector prediction for future CU coding.

In DVMR, the search points are surrounding the initial MV and the MV offset obey the MV difference mirroring rule. Any points that are checked by DMVR, denoted by candidate MV pair (MV0', MV1') obey MV0'=MV0+MV_offset and MV1'=MV1−MV_offset. Where MV_offset represents the refinement offset between the initial MV (e.g., (MV0, MV1) and the refined MV in one of the reference pictures. The refinement search range is two integer luma samples from the initial MV in some examples. The searching includes the integer sample offset search stage and fractional sample refinement stage.

In some examples (e.g., VVC), decoder side motion vector refinement (DMVR) is applied to CU coded in regular merge mode. The pair of MVs obtained from the regular merge candidate is used as input of the DMVR process. DMVR applies the bilateral matching (BM) to refine the input MV pair {MV0, MV1} and uses the refined MV pair {$MV_{refinedL0}$, $MV_{refinedL1}$} for the motion compensated prediction of both luma and chroma components as shown in FIG. 4. The output MVs of DMVR can be referred to as refined MV pair, and can be represented by Eq. (1):

$$MV_{refined\,L0} = MV0 + \Delta mv \quad \text{Eq. (1)}$$

$$MV_{refined\,L1} = MV1 - \Delta mv$$

The motion vector difference Δmv is applied to the input MV pair to obtain the refined MV pair by using the MVD mirroring property, because the input MV pair point to two different reference pictures that have equal difference in picture order count (POC) to the current picture and these two reference pictures are at different temporal direction.

In some examples, DMVR can be applied at subblock level, a luma coded block is divided into 16×16 subblocks for the MV refinement process. The Δmv is derived independently for each of the subblocks.

In some examples, the motion vector refinement search range is two integer luma samples from the initial MV. The search for the motion vector can be performed in two steps, such as a first step of an integer sample offset search stage (also referred to as an integer precision motion search) and a second step of a fractional sample refinement stage (also referred to as a fractional motion search step or a fractional sample offset search).

In some examples, 25 points full search can be applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, the original MV (e.g., initial MV candidate MV0 and MV1) can be preferred during the DMVR process. The SAD between the reference blocks referred by the initial MV candidate is decreased, for example, by ¼ of the SAD value in order to make the initial MV candidate to be preferred.

In some examples, the integer sample search is followed by fractional sample refinement. In some examples, the fractional sample refinement is performed by using fractional sample offset, such as using ½ pel offset in vertical direction and horizontal direction, and the like. In some examples, to save the calculational complexity, the fractional sample refinement is derived by using parametric error surface equation (also referred to as quadratic prediction based method), instead of additional search with SAD comparison. The fractional sample refinement is conditionally invoked based on the output of the integer sample search stage. For example, when the integer sample search stage is terminated with specific integer position (also referred to as center) having the smallest SAD in either the first iteration or the second iteration search, the fractional sample refinement is further applied.

In parametric error surface based sub-pixel offsets estimation, the center position cost (the center position is the point with the smallest SAD in the integer sample offset searching) and the costs at four neighboring positions (e.g., (−1, 0), (0,−1), (1,0), (0,1) from the center position) from the center are used to fit a 2-D parabolic error surface equation, such as Eq. (2)

$$E(x, y) = A(x - x_{min})^2 + B(y - y_{min})^2 + C \quad \text{Eq. (2)}$$

where ($x_{min}$,$y_{min}$) corresponds to the fractional position with the least cost and C corresponds to the minimum cost value. By solving the above equations by using the cost value of the five search points, the ($x_{min}$,$y_{min}$) is computed according to Eq. (3) and Eq. (4):

$$x_{min} = (E(-1, 0) - E(1, 0))/(2(E(-1, 0) + E(1, 0) - 2E(0, 0))) \quad \text{Eq. (3)}$$

$$y_{min} = (E(0, -1) - E(0, 1))/(2((E(0, -1) + E(0, 1) - 2E(0, 0))) \quad \text{Eq. (4)}$$

The values of $x_{min}$ and $y_{min}$ can be automatically constrained to be between −8 and 8 since all cost values are positive and the smallest value is E(0,0). The constraints correspond to half pel offset with 1/16-th-pel MV accuracy in VVC. The computed fractional ($x_{min}$,$y_{min}$) are added to the integer distance refinement MV to get the sub-pixel accurate refinement delta MV. In Eq. (3) and Eq. (4), E(−1,0), E(1,0), E(1,0), E(0,−1) and E(0,0) denote the cost values at the 5 points (the center position and four neighboring positions).

Bilinear-interpolation and sample padding can be applied, such as in VVC. In VVC, the resolution of MVs can be 1/16 luma samples. Samples at a fractional position can be interpolated using an 8-tap interpolation filter. In DMVR, search points can surround an initial fractional-pel MV with an integer sample offset, therefore the samples of the fractional position need to be interpolated for DMVR search process. To reduce the calculation complexity, a bi-linear interpolation filter can be used to generate the fractional samples for the searching process in DMVR. In another important effect, by using the bi-linear filter with a 2-sample search range, the DVMR does not access more reference samples compared to a normal motion compensation process. After the refined MV is attained with a DMVR search process, the normal 8-tap interpolation filter can be applied to generate a final prediction. In order not to access more reference samples compared to a normal MC process, the samples, which may not be needed for the interpolation process based on the original MV but may be needed for the interpolation process based on the refined MV, can be padded from samples that are available.

When a width and/or a height of a CU is larger than 16 luma samples, the CU can be further split into subblocks with a width and/or a height equal to 16 luma samples. A maximum unit size for DMVR searching process can be limit to 16×16.

A technique that is referred to as bi-directional optical flow (BDOF) can be used for example in VVC. BDOF was previously referred to as BIO in the JEM. Compared to the JEM version, the BDOF in VVC can be a simpler version that requires less computation, especially in terms of the number of multiplications and the size of the multiplier.

BDOF can be used to refine a bi-prediction signal of a CU at a 4×4 subblock level. BDOF can be applied to a CU if the CU satisfies conditions (also referred to as requirement for BDOF, or a set of conditions for BDOF) as follows:

(1) The CU is coded using "true" bi-prediction mode, i.e., one of the two reference pictures is prior to the current picture in display order and the other is after the current picture in display order, (2) The distances (e.g., POC difference) from two reference pictures to the current picture are the same, (3) Both reference pictures are short-term reference pictures, (4) The CU is not coded using affine mode or the SbTMVP merge mode, (5) CU has more than 64 luma samples, (6) Both CU height and CU width are larger than or equal to 8 luma samples, (7) BCW weight index indicates equal weight, (8) Weighted prediction (WP) is not enabled for the current CU, and (9) CIIP mode is not used for the current CU.

In some examples, BDOF is only applied to a luma component. As the name of BDOF indicates, the BDOF mode can be based on an optical flow concept, which assumes that a motion of an object is smooth. For each 4×4 subblock, a motion refinement $(v_x, v_y)$ can be calculated by minimizing a difference between L0 and L1 prediction samples. The motion refinement can then be used to adjust the bi-predicted sample values in the 4×4 subblock. BDOF can include steps as follows.

First, horizontal and vertical gradients, $$\frac{\partial I^{(k)}}{\partial x}(i, j)$$

and $$\frac{\partial I^{(k)}}{\partial x}(i, j),\ k = 0, 1,$$

of the two prediction signals from the reference list L0 and the reference list L1 can be computed by directly calculating a difference between two neighboring samples. The horizontal and vertical gradients can be provided in Eq. (5) and Eq. (6) as follows:

$$\frac{\partial I^{(k)}}{\partial x}(i, j) = \left(\left(I^{(k)}(i+1, j) >> shift1\right) - \left(I^{(k)}(i-1, j) >> shift1\right)\right) \quad \text{Eq. (5)}$$

$$\frac{\partial I^{(k)}}{\partial x}(i, j) = \left(\left(I^{(k)}(i, j+1) >> shift1\right) - \left(I^{(k)}(i, j-1) >> shift1\right)\right) \quad \text{Eq. (6)}$$

where $I^{(k)}(i,j)$ can be a sample value at coordinate (i,j) of the prediction signal in list k, k=0,1, and shift1 can be calculated based on a luma bit depth, bitDepth, as shift1=max(6, bitDepth-6).

Then, auto- and cross-correlation of the gradients, $S_1$, $S_2$, $S_3$, Sg and $S_6$, can be calculated according to Eqs. (7)-(11) as follows:

$$S_1 = \sum_{(i,j)\in\Omega} \mathrm{Abs}(\psi_x(i, j)), \quad \text{Eq. (7)}$$

$$S_2 = \sum_{(i,j)\in\Omega} \psi_x(i, j)\cdot \mathrm{Sign}(\psi_y(i, j)) \quad \text{Eq. (8)}$$

$$S_3 = \sum_{(i,j)\in\Omega} \theta(i, j)\cdot \mathrm{Sign}(\psi_x(i, j)) \quad \text{Eq. (9)}$$

$$S_5 = \sum_{(i,j)\in\Omega} \mathrm{Abs}(\psi_y(i, j)) \quad \text{Eq. (10)}$$

$$S_6 = \sum_{(i,j)\in\Omega} \theta(i, j)\cdot \mathrm{Sign}(\psi_y(i, j)) \quad \text{Eq. (11)}$$

where $\psi_x(i,j)$, $\psi_y(i,j)$, and $\theta(i,j)$ can be provided in Eq. (12)-(14) respectively.

$$\psi_x(i, j) = \left(\frac{\partial I^{(1)}}{\partial x}(i, j) + \frac{\partial I^{(0)}}{\partial x}(i, j)\right) >> n_a \quad \text{Eq. (12)}$$

$$\psi_y(i, j) = \left(\frac{\partial I^{(1)}}{\partial y}(i, j) + \frac{\partial I^{(0)}}{\partial y}(i, j)\right) >> n_a \quad \text{Eq. (13)}$$

$$\theta(i, j) = \left(I^{(1)}(i, j) >> n_b\right) - \left(I^{(0)}(i, j) >> n_b\right) \quad \text{Eq. (14)}$$

where Ω can be a 6×6 window around the 4×4 subblock, and the values of $n_a$ and $n_b$ can be set equal to min (1, bitDepth-11) and min (4, bitDepth-8), respectively.

The motion refinement $(v_x,v_y)$ can then be derived using the cross- and auto-correlation terms using Eqs. (15) and (16) as follows:

$$v_x = S_1 > 0?\ clip3(-th'_{BIO},\ th'_{BIO},\ -((S_3\cdot 2^{n_b-n_a}) >> \lfloor \log_2 S_1 \rfloor)):\ 0 \quad \text{Eq. (15)}$$

$$v_y = S_5 > 0?\ clip3\left(-th'_{BIO},\ th'_{BIO},\ -\left(\left(S_6\cdot 2^{n_b-n_a} - \left((v_x S_{2,m}) << n_{S_2} + v_x S_{2,s}\right)/2\right) >> \lfloor \log_2 S_5 \rfloor\right)\right):\ 0 \quad \text{Eq. (16)}$$

where $$S_{2,m} = S_2 \gg n_{S_2},\ S_{2,s} = S_2 \& \left(2^{n_{S_2}} - 1\right),\ th'_{BIO} = 2^{max(5,BD-7)}.$$

$\lfloor\cdot\rfloor$ is a floor function, and $n_{S_2}=12$. Based on the motion refinement and the gradients, an adjustment can be calculated for each sample in the 4×4 subblock based on Eq. (17):

$$b(x, y) = rnd\left(\left(v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial y}\right) + 1\right)/2\right) \quad \text{Eq. (17)}$$

Finally, the BDOF samples of the CU can be calculated by adjusting the bi-prediction samples in Eq. (18) as follows:

$$pred_{BDOF}(x, y) = \left(I^{(0)}(x, y) + I^{(1)}(x, y) + b(x, y) + 0_{offset}\right) >> \text{shift} \quad \text{Eq. (18)}$$

Values can be selected such that multipliers in the BDOF process do not exceed 15-bits, and a maximum bit-width of the intermediate parameters in the BDOF process can be kept within 32-bits.

Figure 5:
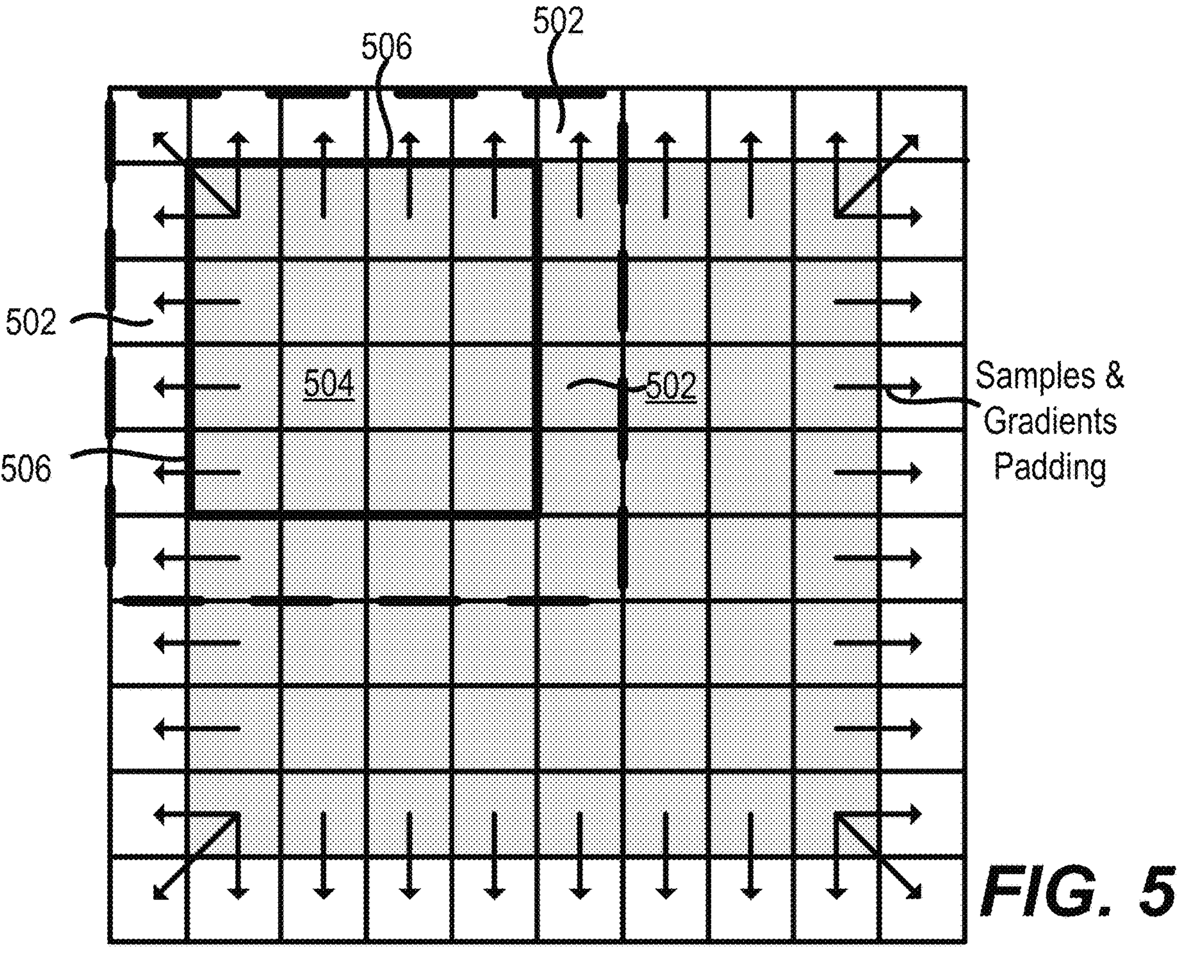
FIG. 5 shows a diagram illustrating some calculations in a bi-directional optical flow (BDOF) in an example.

FIG. 5 shows a diagram illustrating some calculations in a bi-directional optical flow (BDOF) in an example. In order to derive the gradient values, some prediction samples $I^{(k)}(i,j)$ in the list k (k=0,1) outside of the current CU boundaries need to be generated. As shown in FIG. 5, BDOF in VVC can use one extended row/column (502) around boundaries (506) of a CU (504). In order to control the computational complexity of generating the out-of-boundary prediction samples, prediction samples in an extended area (e.g., unshaded region in FIG. 5) can be generated by taking the reference samples at the nearby integer positions (e.g., using a floor( ) operation on the coordinates) directly without interpolation, and a normal 8-tap motion compensation interpolation filter can be used to generate prediction samples within the CU (e.g., the shaded region in FIG. 5). The extended sample values can be used in gradient calculation only. For the remaining steps in the BDOF process, if any samples and gradient values outside of the CU boundaries are needed, the samples and gradient values can be padded (e.g., repeated) from nearest neighbors of the samples and gradient values.

In some examples, sample based BDOF can be used instead of a block based BDOF. In the sample-based BDOF, instead of deriving motion refinement ($v_x$, $v_y$) on a block basis, it is performed per sample. The coding block is divided into 8×8 subblocks. For each subblock, whether to apply BDOF or not is determined by checking the SAD between the two reference subblocks against a threshold. If decided to apply BDOF to a subblock, for every sample in the subblock, a sliding 5×5 window is used and the existing BDOF process is applied for every sliding window to derive $v_x$ and $v_y$. The derived motion refinement ($v_x$, $v_y$) is applied to adjust the bi-predicted sample value for the center sample of the window.

In some examples, multi-pass DMVR can be used. In an example, in the first pass, bilateral matching (BM) is applied to a coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

Specifically, the first pass performs block based bilateral matching MV refinement. In the first pass, a refined MV is derived by applying BM to a coding block. Similar to decoder-side motion vector refinement (DMVR), in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1. The bilateral matching cost can be calculated by any suitable error measuring metric that measures errors between the two reference blocks in L0 and L1. In an example, the bilateral matching cost includes a term that is a sum of absolute differences (SAD) between corresponding samples in the two reference blocks in L0 and L1.

BM can perform local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW×cbH is greater than 64, a mean removed SAD (MR-SAD) cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range.

The existing fractional sample refinement is further applied to derive the final deltaMV. The refined MVs after the first pass is then derived as:

$$\text{MV0\_pass1} = MV0 + deltaMV \quad \text{Eq. (19)}$$

$$\text{MV1\_pass1} = MV1 + deltaMV \quad \text{Eq. (20)}$$

In the second pass, subblock based bilateral matching MV refinement is performed. Specifically, in the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2(sbIdx2) and MV1_pass2 (sbIdx2)) are derived based on the minimum bilateral matching cost between the two reference subblocks in L0 and L1.

For each subblock, BM performs full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated by applying a cost factor to the sum of absolute transformed differences (SATD) cost between two reference subblocks, as: bilCost=satdCost×costFactor. In some examples, the search area (2×sHor+1)×(2×sVer+1) is divided up to 5 diamond shape search regions.

Figure 6:
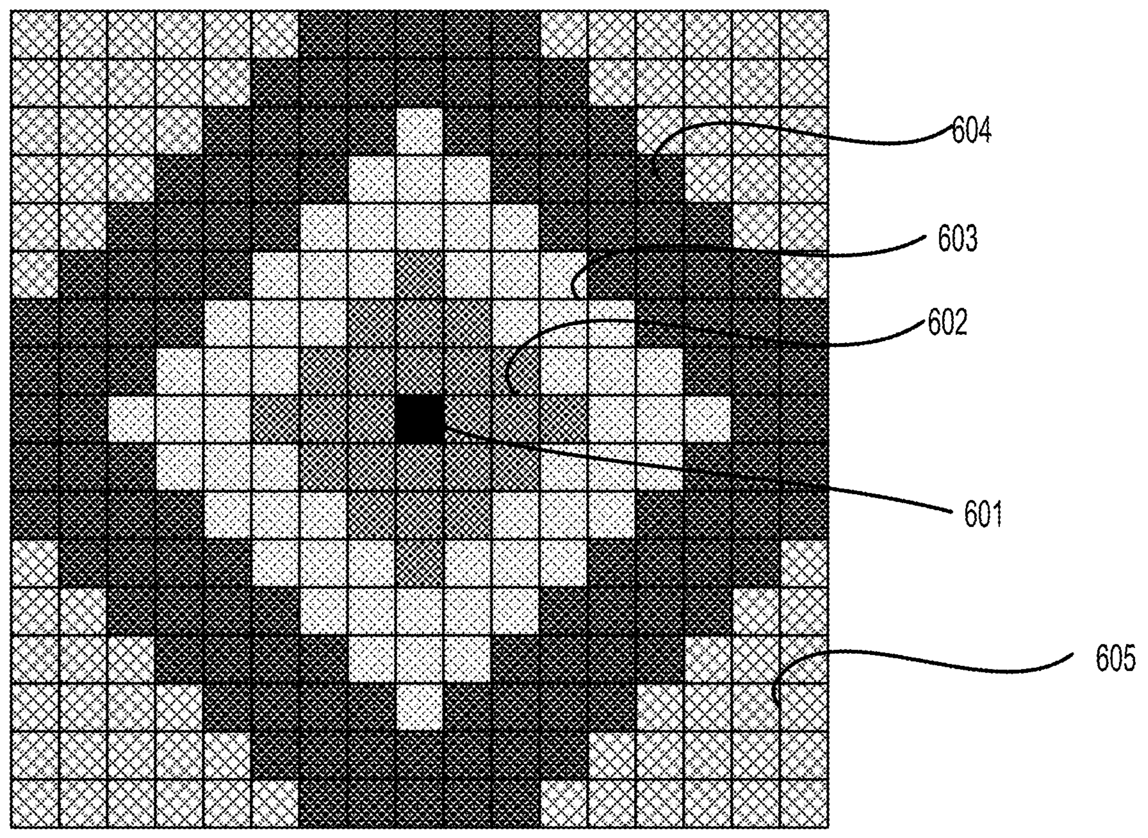
FIG. 6 shows a search area in some examples.

FIG. 6 shows a search area (600) in some examples. The search area (600) is divided to 5 search regions (601)-(605). The shape of the search regions is similar to diamond shape.

In some examples, each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW×sbH, the int-pel full search is terminated, otherwise, the int-pel full search continues to the next search region until all search points are examined. Additionally, if the difference between the previous minimum cost and the current minimum cost in the iteration is less than a threshold that is equal to the area of the block, the search process terminates.

In some examples, the fractional sample refinement, such as the DMVR fractional sample refinement in VVC, is further applied to derive the final deltaMV(sbIdx2). The refined MVs at second pass is then derived as:

$$\text{MV0\_pass2}(sbIdx2) = \text{MV0\_pass1} + deltaMV(sbIdx2) \quad \text{Eq. (21)}$$

$$\text{MV1\_pass2}(sbIdx2) = \text{MV1\_pass1} - deltaMV(sbIdx2) \quad \text{Eq. (22)}$$

In the third pass, subblock based bi-directional optical flow MV refinement can be performed. Specifically, in the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to 1/16 sample precision and clipped between −32 and 32. The refined MVs (MV0_pass3(sbIdx3) and MV1_pass3 (sbIdx3)) at third pass are derived as:

$$\text{MV0\_pass3}(sbIdx3) = \text{MV0\_pass2}(sbIdx2) + bioMV \quad \text{Eq. (23)}$$

$$\text{MV0\_pass3}(sbIdx3) = \text{MV0\_pass2}(sbIdx2) - bioMV \quad \text{Eq. (24)}$$

It is noted that out of frame boundary condition may happen in bi-directional motion compensation. When a motion vector points to an area that is outside the reference picture in part, or entirely, it is referred to as out of boundary (OOB) or out of frame boundary (OOFB).

In bi-directional motion compensation, in some examples, the out of boundary (OOB) prediction samples are discarded and only the non-OOB predictors, when available, are used to generate the final predictor. For example, let $\text{Pos\_x}_{i,j}$ and $\text{Pos\_y}_{i,j}$ denote the position of one prediction sample in a current block, $$\text{Mv\_x}^{Lx}_{i,j} \text{ and } \text{Mv\_y}^{Lx}_{i,j} (x = 0, 1)$$

denote the MV of the current block; $\text{POS}_{LeftBdry}$, $\text{POS}_{RightBdry}$, $\text{Pos}_{TopBdry}$ and $\text{Pos}_{BottomBdry}$ are the positions of four boundaries of the picture. A prediction sample is regarded as OOB (or OOFB) when at least one of the following Eq. (25)-Eq. (28) is satisfied:

$$\left(\text{Pos\_x}_{i,j} + \text{Mv\_x}^{Lx}_{i,j}\right) > (Pos_{RightBdry} + \text{half\_pixel}) \quad \text{Eq. (25)}$$

$$\left(\text{Pos\_x}_{i,j} + \text{Mv\_x}^{Lx}_{i,j}\right) < (Pos_{LeftBdry} - \text{half\_pixel}) \quad \text{Eq. (26)}$$

$$\left(\text{Pos\_y}_{i,j} + \text{Mv\_y}^{Lx}_{i,j}\right) > (Pos_{BottomBdry} + \text{half\_pixel}) \quad \text{Eq. (27)}$$

$$\left(\text{Pos\_y}_{i,j} + \text{Mv\_y}^{Lx}_{i,j}\right) < (Pos_{TopBdry} - \text{half\_pixel}) \quad \text{Eq. (28)}$$

where half_pixel is equal to 8 that represents the half-pel sample distance in the 1/16-pel sample precision. Eq. (25)-Eq. (28) can be referred to as OOB (OOFB) conditions or OOB (OOFB) criteria.

In some examples, after examining the OOB (OOFB) conditions for each sample, the final prediction samples of a bi-directional block can be generated as in following pseudocodes:

If $P^{L0}_{i,j}$ is $OOB$ and $P^{L1}_{i,j}$ is non$-OOB$ $$P^{final}_{i,j} = P^{L1}_{i,j}$$

-continued else if $P^{L0}_{i,j}$ is non$-OOB$ and $P^{L1}_{i,j}$ is $OOB$ $$P^{final}_{i,j} = P^{L0}_{i,j}$$

else $$P^{final}_{i,j} = \left(P^{L0}_{i,j} + P^{L1}_{i,j} + 1\right) >> 1$$

It is noted that the OOB checking process is also applicable when BCW is enabled.

It is noted that, in some examples, the sample-adaptive bi-prediction process only applies to prediction units for which at least a reference bock is first detected as partially or entirely out-of-bounds. Thus, a block-level OOB criteria is first checked. If both prediction blocks are non-OOB, then the usual bi-prediction takes place.

Bi-directional motion compensation of samples in the current picture is based on prediction samples in two reference pictures. During the bi-prediction motion compensation, the out of boundary (OOB) prediction samples are discarded and only the non-OOB predictors (prediction samples), when available, are used to generate the final predictors for samples in the current picture. According to an aspect of the disclosure, various bi-directional coding tools are used to provide finer motion compensation to improve bi-directional motion compensation. For example, BDOF can provide sample wise finer motion compensation, DMVR can use bilateral matching to provide motion refinement at block or subblock level. Some bi-directional coding tools can generate offset information based on reference samples of the reference pictures. For example, DMVR can calculate cost values associated with candidate MV offsets by bilateral matching of reference samples of the reference pictures, and determine an optimum MV offset based on the cost values. In another example, BDOF can calculate an offset (e.g., adjustment in Eq. (17)) to the prediction according to the motion refinement and the gradients that are calculated from reference samples of the reference pictures. It is noted that when OOB (OOFB) prediction, such as using padded values from neighboring samples as the reference samples that are OOB (OOFB), is used in the bi-directional coding tools, such as the determination of MV offset by bilateral matching process in DMVR and the offset calculation in BDOF, the offset obtained by the bi-directional coding tools, such as the refined MV with OOB condition in the DMVR, the offset in the BDOF, may not be accurate and can cause coding loss.

Some aspects of the disclosure provide techniques to improve offset calculation accuracy in the bi-directional coding tools with OOB (OOFB) conditions, such as the offset calculation in the BDOF with OOB (OOFB) conditions, the MV offset by bilateral matching process in DMVR with OOB (OOFB) conditions, and the like. In some examples, a bi-directional prediction with a refinement is performed by encoder/decoder for a current block in a current picture. The refinement determines an offset based on a plurality of calculations, and each calculation includes reference samples of a first reference picture and a second reference picture for the current picture. The encoder/decoder determines that a first calculation in the plurality of calculations uses a first reference sample of the first reference picture that is an out of boundary (OOB) prediction sample. An OOB prediction sample of a reference picture is out of a frame boundary of the reference picture. The encoder/decoder performs the refinement that determines the offset based on the plurality of calculations with at least the first reference sample being excluded, and reconstructs the current block according to the bi-directional prediction with the offset.

In the following description, terms of out of boundary (OOB), out of frame boundary (OOFB), bilateral matching (BM), decoder side motion vector refinement (DMVR), bi-directional optical flow (BDOF) are used, and some definitions of the terms are provided in the above description. In the following description, discarding a coding tool or an operation refers to disallowing or not choosing such a tool or operation as a result.

According to an aspect of the disclosure, the bilateral matching block is discarded when the bilateral matching block has OOB (also referred to as OOFB) prediction sample. More specifically, at least one block of a block pair during bilateral matching has OOB (OOFB) prediction sample, the block pair will be discarded. For example, when bilateral matching is used, a pair of reference blocks (also referred to as block pair or bilateral matching blocks) are identified in respective reference pictures of the current picture, for example according to a candidate motion vector, and a distortion between the two reference blocks can be calculated. In an example, when a reference block has a sample that satisfies an OOB condition, such as one of Eq. (25)-Eq. (28), bilateral matching of the pair of reference blocks is not performed, in other word, the pair of reference blocks are discarded, and the candidate motion vector may be disallowed.

In some implementation examples, the relative cost value of the discarded block pair could be set as a maximum value or be marked as unavailable. For example, bilateral matching is not performed, and a maximum cost value is assigned as the cost value of the pair of reference blocks (block pair).

In some examples, the fractional block matching is used to replace the quadratic prediction-based method when at least one integer block matching search around the best integer position has maximum cost value or unavailable cost value. For example, DMVR can perform motion vector search in two steps, such as a first step of integer precision motion search step, and a second step of fractional sample refinement. In the first step, 25 points of integer sample offsets are searched, and BM can be performed for a point of integer sample offset when a pair of reference blocks identified according to the integer sample offset are available (no OOB prediction sample in the reference blocks). However, when at least one reference block identified according to the integer sample offset has an OOB prediction sample, a maximum cost value or unavailable cost value is assigned to the pair of reference blocks (also referred to as integer blocks) associated with the integer sample offset. The first step determines a best integer position with a lowest cost value (e.g., calculated by BM). In the second step, in some examples, when four neighboring integer positions around the best integer position are available (e.g., BM operations are performed), quadratic prediction-based method, such as using parametric error surface equation, can be performed to save computation complexity. However, in some examples, when at least one neighboring position (neighboring integer offset position) around the best integer position (integer offset position) has maximum cost value or unavailable cost value, for example due to existence of at least an OOB prediction sample in the reference blocks for the neighboring integer offset position, then the fractional block matching (e.g., using fractional sample offset to identify reference blocks, using bilateral matching to determine cost value for the reference blocks, and using cost values to determine the best fractional position) can be used to replace the quadratic prediction based method.

In some examples, the sub-block level OOB (OOFB) condition is checked for subblock-based DMVR. In some examples, for a subblock, during the first step of integer sample offset search for the DMVR, when a pair of reference subblocks associated with an MV offset candidate has at least one OOB reference subblock (e.g., including at least one reference sample that is out of boundary of the reference picture), the MV offset candidate (and the pair of reference subblocks associated with the MV offset candidate) is not used (is discarded). During the second step of fractional sample refinement for the subblock, when at least one neighboring integer position around the best integer position has maximum cost value or unavailable cost value, for example due to existence of at least an OOB prediction sample in the reference subblocks for the neighboring integer position, then the fractional block matching (e.g., using fractional sample offset to identify reference subblocks, using bilateral matching to determine cost value for the reference subblocks, using cost values to determine the best fractional position) can be used to replace the quadratic prediction based method.

According to an aspect of the disclosure, the BDOF at block/subblock level can be discarded when the corresponding block/subblock satisfies the OOB (OOFB) conditions. In some examples, to calculate offsets for applying BDOF at block level for a current block, first reference samples in the first reference picture and second reference samples in the second reference picture are used. When at least one of the first reference samples or one of the second reference samples is OOB prediction sample, then BDOF is discarded at the block level, and the current block is predicted without BDOF.

In some examples, to calculate offsets for applying BDOF at subblock level for a current subblock, first reference samples in the first reference picture and second reference samples in the second reference picture are used. When at least one of the first reference samples or one of the second reference samples is OOB sample, then BDOF is discarded at the subblock level, and the current subblock is predicted without BDOF.

According to an aspect of the disclosure, OOB prediction sample can be discarded during the bilateral matching process. More specifically, the sample with OOB prediction in one of the bilateral matching block is not used for cost calculation. To have fair cost comparison, the normalized bilateral matching cost is derived from the cost divided by the number of non-OOB samples. In some examples, when bilateral matching is used, a pair of reference blocks (also referred to as block pair or bilateral matching blocks) are identified in respective reference pictures of the current picture, for example according to a candidate motion vector (e.g., a combination of an initial MV with an MV offset candidate), and a distortion measure between the two reference blocks can be calculated. In an example, when a reference block has one or more samples that satisfy an OOB condition, such as one or more of Eq. (25)-Eq. (28), bilateral matching cost of the pair of reference blocks is calculated without the one or more samples that are OOB. In some examples, the bilateral matching cost is normalized, for example, based on the number of sample pairs used in the calculation of the bilateral matching cost. In an example, the bilateral matching cost is calculated as a sum of the distortion between a plurality of sample pairs that are within the boundary of the reference pictures (non-OOB samples), such as a sum of absolute difference of the plurality of sample pairs. The bilateral matching cost is normalized based on (e.g., average by) the number of the sample pairs in the calculation of the bilateral matching cost.

In some examples, the number of samples that used to calculate the normalized BM cost can be min (#L0 non-OOB samples, #L1 non-OOB samples). This can be applied to both L0 and L1 predictors are OOB, as well as only one of L0 and L1 predictors is OOB cases. In an example, the reference block in the first reference picture from the reference picture list L0 has OOB samples, and the reference block in the second reference picture from the reference picture list L1 does not have OOB sample, thus the number of non-OOB samples in the reference block of the first reference picture (denoted by #L0 non-OOB samples) is smaller than the number of non-OOB samples in the reference block of the second reference picture from the reference picture list L1 (denoted by #L1 non-OOB samples), thus the number of non-OOB samples in the reference block of the first reference picture (#L0 non-OOB samples) is used in the normalization.

According to an aspect of the disclosure, the bilateral matching block is discarded when the ratio of OOB prediction samples in the bilateral matching block is more than a pre-defined threshold. More specifically, when the number of OOB prediction samples is beyond a predefined ratio of the all the prediction samples used in the bilateral matching, the block pair is discarded during the bilateral matching. Example values of the ratio include, but not limited to ½, ⅔. In some examples, when bilateral matching is used, a pair of reference blocks (also referred to as block pair or bilateral matching blocks) are identified in respective reference pictures of the current picture, for example according to a candidate motion vector (e.g., a combination of an initial MV with an MV offset candidate), and a distortion between the two reference blocks can be calculated. In an example, a reference block has one or more samples that satisfy an OOB condition, such as one or more of Eq. (25)-Eq. (28), and the one or more samples are referred to as OOB samples. When the number of OOB samples is smaller than or equal to the predefined threshold, bilateral matching cost of the pair of reference blocks is calculated without the OOB samples. The bilateral matching cost is normalized, for example, based on the number of sample pairs (e.g., non OOB sample pairs) used in the calculation of the bilateral matching cost. However, when the number of OOB samples is more than the predefined threshold (e.g., a ratio of the number of OOB samples to a total number of samples in a reference block is larger than a ratio threshold), the pair of reference blocks can be discarded, and the candidate motion vector is not further considered.

Figure 7:
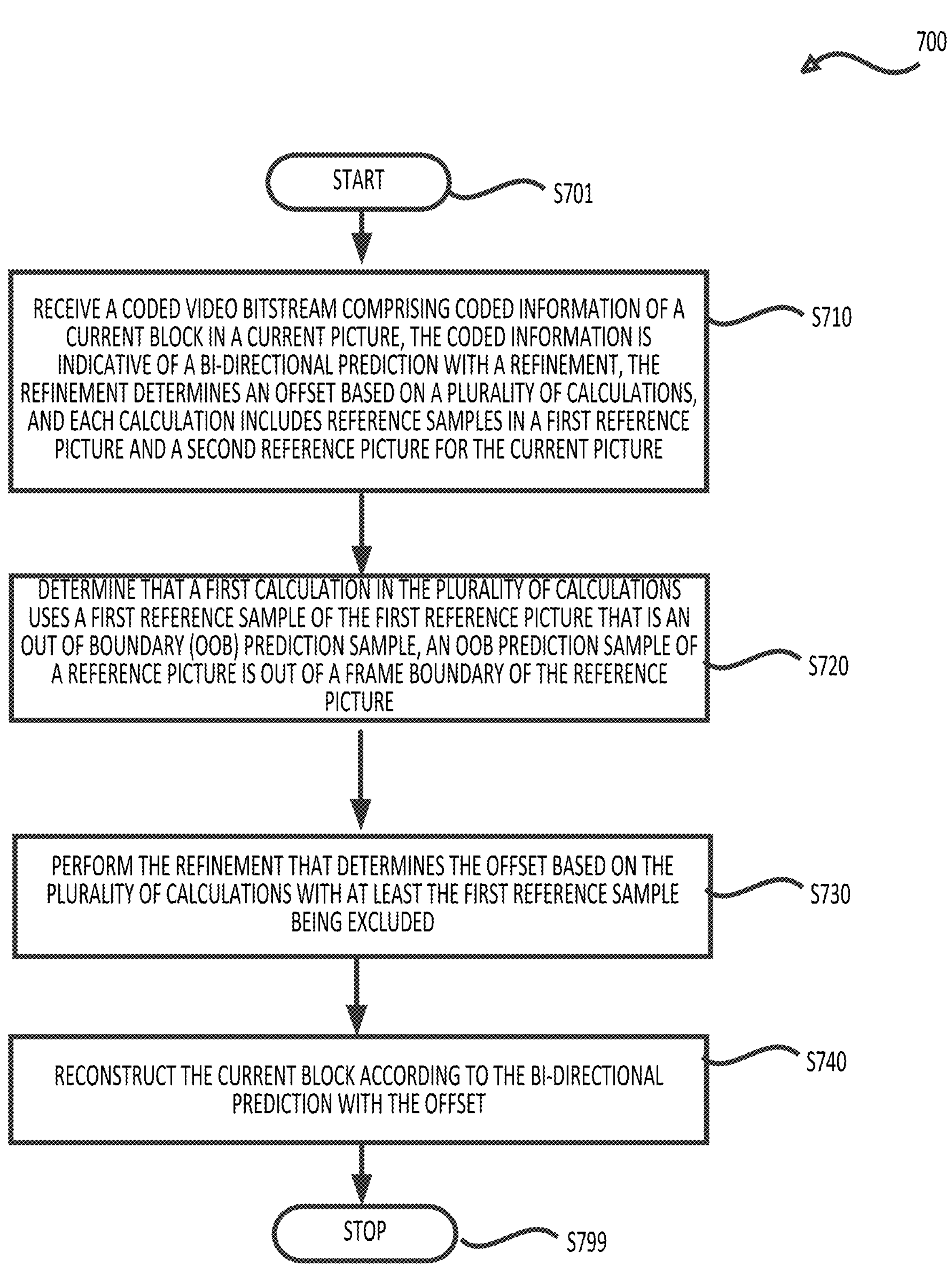
FIG. 7 shows a flow chart outlining a decoding process according to some embodiments of the disclosure.

FIG. 7 shows a flow chart outlining a process (700) according to an embodiment of the disclosure. The process (700) can be used in a video decoder. In various embodiments, the process (700) is executed by processing circuitry, such as the processing circuitry that performs functions of the video decoder (110), the processing circuitry that performs functions of the video decoder (210), and the like. In some embodiments, the process (700) is implemented in software instructions, thus when the processing circuitry executes the software instructions, the processing circuitry performs the process (700). The process starts at (S701) and proceeds to (S710).

At (S710), a coded video bitstream is received. The coded video bitstream includes coded information of a current block in a current picture. The coded information is indicative of a bi-directional prediction with a refinement, the refinement determines an offset based on a plurality of calculations, and each calculation includes reference samples of a first reference picture and a second reference picture for the current picture.

At (S720), it is determined that a first calculation in the plurality of calculations uses a first reference sample of the first reference picture that is an out of boundary (OOB) prediction sample. An OOB prediction sample of a reference picture is defined as a sample that is out of a frame boundary of the reference picture.

At (S730), the refinement is performed, the refinement determines the offset based on the plurality of calculations with at least the first reference sample being excluded At (S740), the current block is reconstructed according to the bi-directional prediction with the offset.

According to an aspect of the disclosure, the refinement includes a decoder side motion vector refinement (DMVR) that determines a motion vector offset based on calculations of bilateral matching (BM) cost values associated with motion vector offset candidates.

In some examples, the first calculation calculates a first BM cost as a distortion measure between corresponding reference samples in a pair of reference blocks that are associated with a first motion vector offset candidate, and a first reference block in the pair of reference blocks include the first reference sample that is the OOB prediction sample. The first motion vector offset candidate is discarded, and thus the first calculation is excluded from the plurality of calculations.

To discard the first motion vector offset candidate, in an example, a maximum BM cost value is assigned to the first motion vector offset candidate. In another example, the first motion vector offset candidate is marked as unavailable.

In some examples, the first motion vector offset candidate corresponds to an integer position that is a neighboring position of a specific position having a lowest BM cost. In an example, in response to the first motion vector offset candidate being discarded, to use a fractional block matching to replace quadratic prediction for a fractional sample refinement at the specific position is determined. The fractional sample refinement is performed for the specific position by calculating BM cost values at positions corresponding to fractional sample offsets.

In some examples, the first calculation calculates a first BM cost as a distortion measure between corresponding reference samples in a pair of reference blocks that are associated with a first motion vector offset candidate, and a first reference block in the pair of reference blocks comprises the first reference sample that is the OOB prediction sample. The first calculation is performed with the first reference sample being excluded from the distortion measure. In some examples, the first BM cost is normalized based on a pair number of the corresponding reference samples in the first calculation.

In some examples, a plurality of reference sample pairs in the pair of reference blocks that each includes at least a reference sample that is an OOB prediction sample can be determined. Then, whether a ratio of a pair number of the plurality of reference sample pairs to a total pair number of reference sample pairs in the pair of reference blocks is higher than a threshold can be determined. In response to the ratio being higher than the threshold, the first motion vector offset candidate is discarded and thus the first calculation is excluded from the plurality of calculations. In response to the ratio being lower than the threshold, the first calculation is performed with the plurality of reference sample pairs being excluded from the distortion measure.

According to an aspect of the disclosure, the current block can be a coding block or can be a subblock of a coding block.

According to an aspect of the disclosure, the refinement includes a bi-directional optical flow (BDOF) that calculates a prediction offset with optical flow based on correlation calculations of gradients according to the reference samples of the first reference picture and the second reference picture.

Then, the process proceeds to (S799) and terminates.

The process (700) can be suitably adapted. Step(s) in the process (700) can be modified and/or omitted. Additional step(s) can be added. Any suitable order of implementation can be used.

Figure 8:
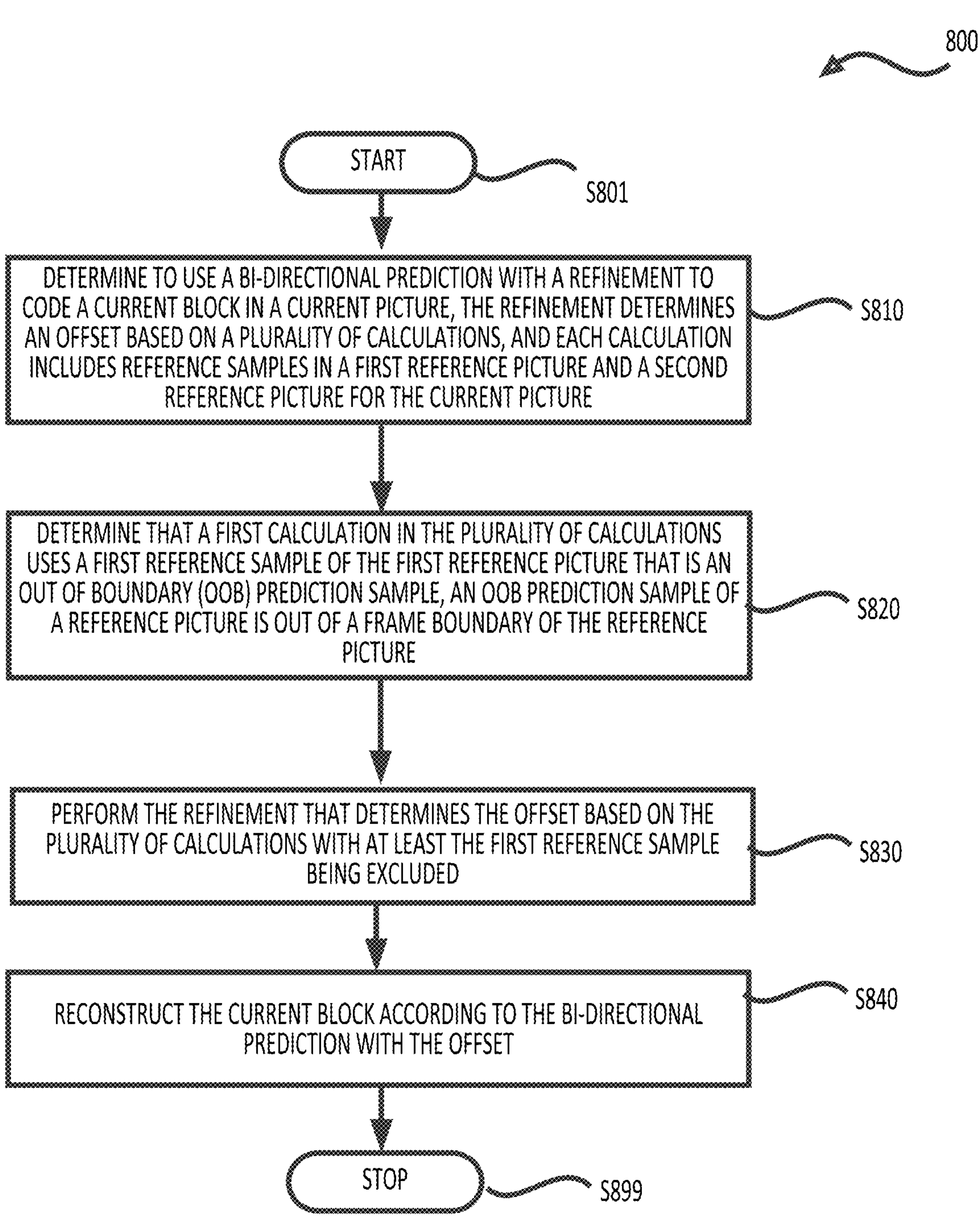
FIG. 8 shows a flow chart outlining an encoding process according to some embodiments of the disclosure.

FIG. 8 shows a flow chart outlining a process (800) according to an embodiment of the disclosure. The process (800) can be used in a video encoder. In various embodiments, the process (800) is executed by processing circuitry, such as the processing circuitry that performs functions of the video encoder (103), the processing circuitry that performs functions of the video encoder (303), and the like. In some embodiments, the process (800) is implemented in software instructions, thus when the processing circuitry executes the software instructions, the processing circuitry performs the process (800). The process starts at (S801) and proceeds to (S810).

At (S810), to use a bi-directional prediction with a refinement is determined to code a current block in a current picture. The refinement determines an offset based on a plurality of calculations, and each calculation includes reference samples in a first reference picture and a second reference picture for the current picture.

At (S820), it is determined that a first calculation in the plurality of calculations uses a first reference sample of the first reference picture that is an out of boundary (OOB) prediction sample. An OOB prediction sample of a reference picture is defined as a sample that is out of a frame boundary of the reference picture.

At (S830), the refinement that determines the offset based on the plurality of calculations with at least the first reference sample being excluded is performed.

At (S840), the current block is reconstructed according to the bi-directional prediction with the offset.

According to an aspect of the disclosure, the refinement includes a decoder side motion vector refinement (DMVR) that determines a motion vector offset based on calculations of bilateral matching (BM) cost values associated with motion vector offset candidates.

In some examples, the first calculation calculates a first BM cost as a distortion measure between corresponding reference samples in a pair of reference blocks that are associated with a first motion vector offset candidate, and a first reference block in the pair of reference blocks include the first reference sample that is the OOB prediction sample. The first motion vector offset candidate is discarded, and thus the first calculation is excluded from the plurality of calculations.

To discard the first motion vector offset candidate, in an example, a maximum BM cost value is assigned to the first motion vector offset candidate. In another example, the first motion vector offset candidate is marked as unavailable.

In some examples, the first motion vector offset candidate corresponds to an integer position that is a neighboring position of a specific position having a lowest BM cost. In an example, in response to the first motion vector offset candidate being discarded, to use a fractional block matching to replace quadratic prediction for a fractional sample refinement at the specific position is determined. The fractional sample refinement is performed for the specific position by calculating BM cost values at positions corresponding to fractional sample offsets.

In some examples, the first calculation calculates a first BM cost as a distortion measure between corresponding reference samples in a pair of reference blocks that are associated with a first motion vector offset candidate, and a first reference block in the pair of reference blocks comprises the first reference sample that is the OOB prediction sample. The first calculation is performed with the first reference sample being excluded from the distortion measure. In some examples, the first BM cost is normalized based on a pair number of the corresponding reference samples in the first calculation.

In some examples, a plurality of reference sample pairs in the pair of reference blocks that each includes at least a reference sample that is an OOB prediction sample can be determined. Then, whether a ratio of a pair number of the plurality of reference sample pairs to a total pair number of reference sample pairs in the pair of reference blocks is higher than a threshold can be determined. In response to the ratio being higher than the threshold, the first motion vector offset candidate is discarded and thus the first calculation is excluded from the plurality of calculations. In response to the ratio being lower than the threshold, the first calculation is performed with the plurality of reference sample pairs being excluded from the distortion measure.

According to an aspect of the disclosure, the current block can be a coding block or can be a subblock of a coding block.

According to an aspect of the disclosure, the refinement includes a bi-directional optical flow (BDOF) that calculates a prediction offset with optical flow based on correlation calculations of gradients according to the reference samples of the first reference picture and the second reference picture.

Then, the process proceeds to (S899) and terminates.

The process (800) can be suitably adapted. Step(s) in the process (800) can be modified and/or omitted. Additional step(s) can be added. Any suitable order of implementation can be used.

The techniques described above, can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
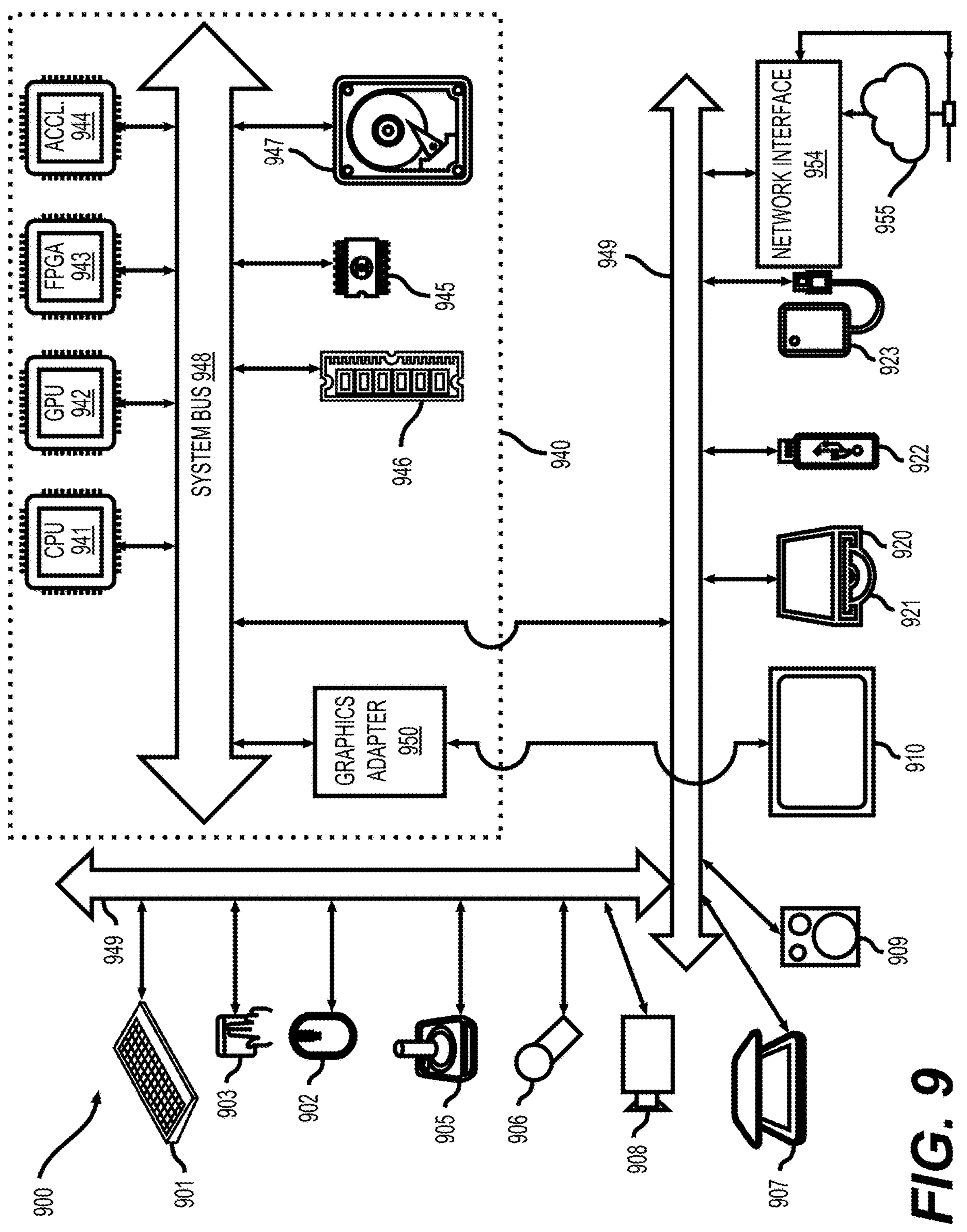
FIG. 9 is a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:

receiving a coded video bitstream comprising coded information of a current block in a current picture, the coded information indicative of a decoder-side motion vector refinement (DMVR) that determines a motion vector offset based on motion vector offset candidates, and each motion vector offset candidate corresponding to reference samples associated with a first reference picture for the current picture and a second reference picture for the current picture;

determining that a first reference block corresponding to a first motion vector offset candidate in the motion vector offset candidates includes a first reference sample that is an out of boundary (OOB) prediction sample of the first reference picture, the OOB prediction sample of the first reference picture being out of a frame boundary of the first reference picture, the first motion vector offset candidate corresponding to the first reference block and a second reference block associated with the second reference picture;

performing the DMVR that determines the motion vector offset based on a plurality of calculations, wherein (i) the first reference block including the OOB prediction sample and (ii) the second reference block are not used in the plurality of calculations; and reconstructing the current block according to the DMVR with the motion vector offset.

2. The method of claim 1, wherein the performing the DMVR further comprises: determining bilateral matching (BM) cost values associated with the motion vector offset candidates.

3. The method of claim 2, wherein the determining the BM cost values comprises:

determining one of the BM cost values as a distortion measure between corresponding reference samples in a pair of reference blocks that are associated with a second motion vector offset candidate, the pair of reference blocks being located within the first reference picture and the second reference picture, respectively.

4. The method of claim 2, wherein the determining the BM cost values further comprises at least one of:

assigning a maximum BM cost value in the BM cost values as associated with the first motion vector offset candidate; and/or marking the first motion vector offset candidate as unavailable.

5. The method of claim 2, wherein the first motion vector offset candidate corresponds to an integer position that is a neighboring position of a specific position having a lowest BM cost, and the method further comprises:

determining to use a fractional block matching to replace quadratic prediction for a fractional sample refinement at the specific position; and performing the fractional sample refinement for the specific position by calculating BM cost values at positions corresponding to fractional sample offsets.

6. The method of claim 1, wherein the current block is a coding block or a subblock of the coding block.

7. A method of video encoding, comprising:

determining that a first reference block corresponding to a first motion vector offset candidate in motion vector offset candidates includes a first reference sample that is an out of boundary (OOB) prediction sample of a first reference picture for a current picture, the OOB prediction sample of the first reference picture being out of a frame boundary of the first reference picture, the first motion vector offset candidate corresponding to the first reference block and a second reference block associated with a second reference picture for the current picture, a current block in the current picture being coded using a decoder-side motion vector refinement (DMVR) that determines a motion vector offset based on the motion vector offset candidates, and each motion vector offset candidate corresponding to reference samples associated with the first reference picture and the second reference picture for the current picture;

performing the DMVR that determines the motion vector offset based on a plurality of calculations, wherein (i) the first reference block including the OOB prediction sample and (ii) the second reference block are not used in the plurality of calculations; and encoding, in a bitstream, (i) the current block according to the DMVR with the motion vector offset and (ii) coded information of the current block that indicates the DMVR.

8. The method of claim 7, wherein the performing the DMVR further comprises: determining bilateral matching (BM) cost values associated with the motion vector offset candidates.

9. The method of claim 8, wherein the determining the BM cost values comprises:

determining one of the BM cost values as a distortion measure between corresponding reference samples in a pair of reference blocks that are associated with a second motion vector offset candidate, the pair of reference blocks being located within the first reference picture and the second reference picture, respectively.

10. The method of claim 8, wherein the determining the BM cost values further comprises at least one of:

assigning a maximum BM cost value in the BM cost values as associated with the first motion vector offset candidate; and/or marking the first motion vector offset candidate as unavailable.

11. The method of claim 8, wherein the first motion vector offset candidate corresponds to an integer position that is a neighboring position of a specific position having a lowest BM cost, and the method further comprises:

determining to use a fractional block matching to replace quadratic prediction for a fractional sample refinement at the specific position; and performing the fractional sample refinement for the specific position by calculating BM cost values at positions corresponding to fractional sample offsets.

12. A non-transitory computer-readable storage medium storing instructions which when executed by a processor cause the processor to perform a method of encoding a bitstream comprising:

determining that a first reference block corresponding to a first motion vector offset candidate in motion vector offset candidates includes a first reference sample that is an out of boundary (OOB) prediction sample of a first reference picture for a current picture, the OOB prediction sample of the first reference picture being out of a frame boundary of the first reference picture, the first motion vector offset candidate corresponding to the first reference block and a second reference block associated with a second reference picture, a current block in the current picture being coded using a decoder-side motion vector refinement (DMVR) that determines a motion vector offset based on the motion vector offset candidates, and each motion vector offset candidate corresponding to reference samples associated with the first reference picture and the second reference picture for the current picture;

performing the DMVR that determines the motion vector offset based on a plurality of calculations wherein (i) the first reference block including the OOB prediction sample and (ii) the second reference block are not used in the plurality of calculations;

encoding, in the bitstream, (i) the current block according to the DMVR with the motion vector offset and (ii) coded information of the current block that indicates the DMVR; and transmitting the encoded bitstream.

* * * * *